(12) United States Patent
Fort (10) Patent No.: US 11,777,704 B1
(45) Date of Patent: Oct. 3, 2023

(54) CONCURRENT MULTISTANDARD DETECTION RECEIVER WITH PREPACKET TRANSMISSION DETECTION

(71) Applicant: Qorvo US, Inc., Greensboro, NC (US)

(72) Inventor: Andrew Fort, Kessel Lo (BE)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/654,448

(22) Filed: Mar. 11, 2022

(51) Int. Cl.
| | |
|---|---|
| *H04W 56/00* | (2009.01) |
| *H04L 7/04* | (2006.01) |
| *H04L 69/22* | (2022.01) |
| *H04B 7/26* | (2006.01) |
| *H04L 69/18* | (2022.01) |

(52) U.S. Cl.
CPC ........... *H04L 7/042* (2013.01); *H04B 7/2643* (2013.01); *H04L 69/22* (2013.01); *H04W 56/001* (2013.01); *H04L 69/18* (2013.01)

(58) Field of Classification Search
CPC ...... H04W 56/001; H04L 7/042; H04L 69/22; H04L 69/18; H04B 7/2643
USPC ......................................................... 370/350
See application file for complete search history.

(56) References Cited

U.S. PATENT DOCUMENTS

| | | | |
|---|---|---|---|
| 8,032,095 B1 | 10/2011 | Tang et al. | |
| 2010/0097951 A1* | 4/2010 | Espina Perez | ........ H04L 67/125 370/252 |
| 2012/0163499 A1* | 6/2012 | Kim | .................... H04L 27/3854 375/295 |
| 2017/0188181 A1* | 6/2017 | Jin | ......................... H04W 76/15 |
| 2017/0250737 A1* | 8/2017 | Rivière | .................. H04B 1/406 |
| 2018/0063873 A1* | 3/2018 | Desai | ................... H04B 1/0067 |
| 2018/0176050 A1* | 6/2018 | Kikuzuki | ............ H04L 27/0012 |
| 2018/0324829 A1* | 11/2018 | Van Driest | ........ H04W 56/0085 |
| 2019/0052381 A1 | 2/2019 | Abdelmonem | |
| 2019/0166450 A1* | 5/2019 | Fort | ..................... H04B 5/0031 |
| 2019/0238309 A1 | 8/2019 | Fort | |
| 2020/0195544 A1* | 6/2020 | Zhou | ..................... H04L 27/106 |
| 2020/0287658 A1* | 9/2020 | Fort | .................... H04L 27/0014 |

(Continued)

FOREIGN PATENT DOCUMENTS

EP     1595344 A2    11/2005

OTHER PUBLICATIONS

Extended European Search Report for European Patent Application No. 23157954.1, dated Jul. 27, 2023, 9 pages.

*Primary Examiner* — Robert J Lopata
(74) *Attorney, Agent, or Firm* — Withrow & Terranova, P.L.L.C.

(57) ABSTRACT

A concurrent multistandard detection receiver with prepacket transmission detection capabilities is disclosed. In one aspect, a receiver is configured to switch between two different wireless protocols, alternately listening for incoming messages on one then the other protocol. For at least one listening period, the receiver uses two pretransmission detectors that are configured to detect predictable pretransmission emissions. A third detector may detect traditional transmissions. On detection of a signal that matches a predictable pretransmission emission or a traditional transmission, the receiver confirms that an incoming signal according to that standard is being received and acts in accordance with that signal. If no such emission or transmission was received, or if after trying to confirm the presence of an incoming signal fails, the receiver switches back to listening according to the other protocol.

20 Claims, 5 Drawing Sheets

(56) References Cited

U.S. PATENT DOCUMENTS

2021/0135692 A1* 5/2021 De Ruijter ........... H04B 1/0075
2021/0242894 A1* 8/2021 De Ruijter ........... H04B 1/1638

* cited by examiner

CONCURRENT MULTISTANDARD DETECTION RECEIVER WITH PREPACKET TRANSMISSION DETECTION

BACKGROUND

I. Field of the Disclosure

The technology of the disclosure relates generally to receivers in devices that work in a variety of standards such as ZIGBEE and BLUETOOTH LOW ENERGY (BLE).

II. Background

Computing devices abound in modern society, and more particularly, mobile communication devices have become increasingly common. With the advent of the myriad functions available to such devices, there has been increased pressure to find ways to reduce power consumption. The pressure to reduce power consumption is particularly acute in the class of computing devices known as the Internet of Things (IoT), which are typically small, wearable devices that operate at relatively short ranges and are coin-cell battery powered.

Because of battery size, the pressure to conserve power is a commercial reality. Historically, IEEE 802.15.4 (Zigbee) has been used for IoT devices. There has been a movement in the industry towards BLUETOOTH LOW ENERGY (BLE). For success in a smart-home environment, BLE radio designs must be low power and provide sufficient range to cover an entire household, even where line-of-sight may be compromised.

Market participants trying to provide the greatest flexibility now design IoT devices to incorporate both ZIGBEE and BLE. The brute force approach is to provide two distinct receivers. This increases power consumption in an undesirable manner as well as increasing the overall cost of the device as many receiver elements are duplicated. A second approach is to use some form of time division multiplexing for the receiver where the receiver listens for one type of signal for a predetermined amount of time and then switches to listen for the other type of signal. There is room for innovation in providing a better way to capture signals from both standards in a single device.

SUMMARY

Aspects disclosed in the detailed description include a concurrent multistandard detection receiver with prepacket transmission detection capabilities. In an exemplary aspect, a receiver is configured to switch between two different wireless protocols, alternately listening for incoming messages on one then the other protocol. For at least one listening period, the receiver uses two pretransmission detectors that are configured to detect predictable pretransmission emissions. A third detector may detect traditional transmissions. On detection of a signal that matches a predictable pretransmission emission or a traditional transmission, the receiver confirms that an incoming signal according to that standard is being received and acts in accordance with that signal. If no such emission or transmission was received, or if after trying to confirm the presence of an incoming signal fails, the receiver switches back to listening according to the other protocol.

In this regard in one aspect, a receiver is disclosed. The receiver comprises a first detector configured to detect, within a predefined time slot, a packet in an incoming signal through correlation against a known synchronization preamble. The receiver also comprises a second detector configured to detect prepacket emissions through constant wave detection in the incoming signal. The receiver also comprises a control circuit coupled to the first detector and the second detector. The control circuit is configured to conclude that a constant wave signal is present if an output of the second detector indicates that a detected signal exceeds a threshold. The control circuit is also configured, responsive to concluding that the constant wave signal is present, to extend a time period in which the first detector is allowed to detect a packet preamble.

In another aspect, a receiver is disclosed. The receiver comprises a first detector configured to detect, within a predefined time slot, a packet in an incoming signal through correlation with a known preamble. The receiver also comprises a second detector configured to detect prepacket emissions through leakage transmission detection in the incoming signal. The receiver also comprises a control circuit coupled to the first detector and the second detector. The control circuit is configured to conclude that a leakage transmission is present if an output of the second detector indicates that a detected signal exceeds a threshold. The control circuit is also configured, responsive to concluding that the leakage transmission is present, to extend a time period in which the first detector is allowed to detect a packet preamble.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a concurrent multistandard detection receiver with prepacket transmission detection capabilities. In an exemplary aspect, a receiver is configured to switch between two different wireless protocols, alternately listening for incoming messages on one then the other protocol. For at least one listening period, the receiver uses two pretransmission detectors that are configured to detect predictable pretransmission emissions. A third detector may detect traditional transmissions and may be used to activate the two pretransmission detectors if signal levels are above a threshold. On detection of a signal that matches a predictable pretransmission emission or a traditional transmission, the receiver confirms that an incoming signal according to that standard is being received and acts in accordance with that signal. If no such emission or transmission was received, or if after trying to confirm the presence of an incoming signal fails, the receiver switches back to listening according to the other protocol.

Figure 1:
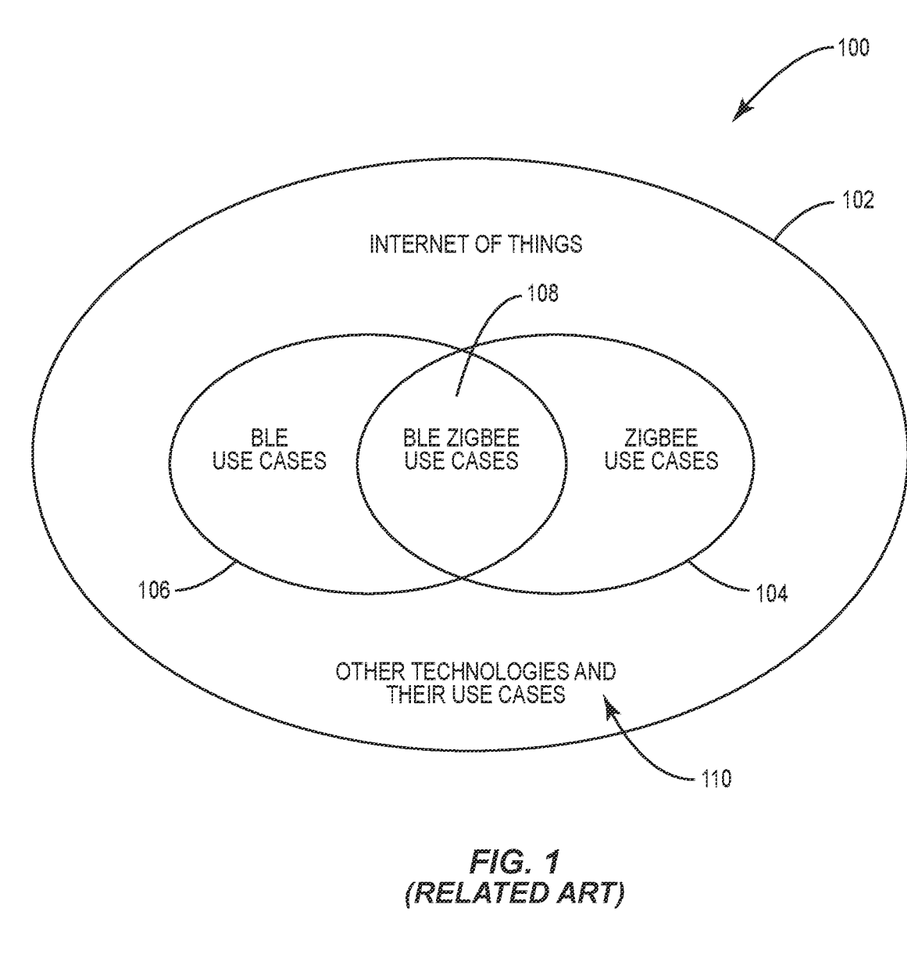
FIG. 1 is a Venn diagram of an exemplary set of Internet of Things (IoT) devices showing the intersection of devices that use two protocols concurrently.
Figure 2:
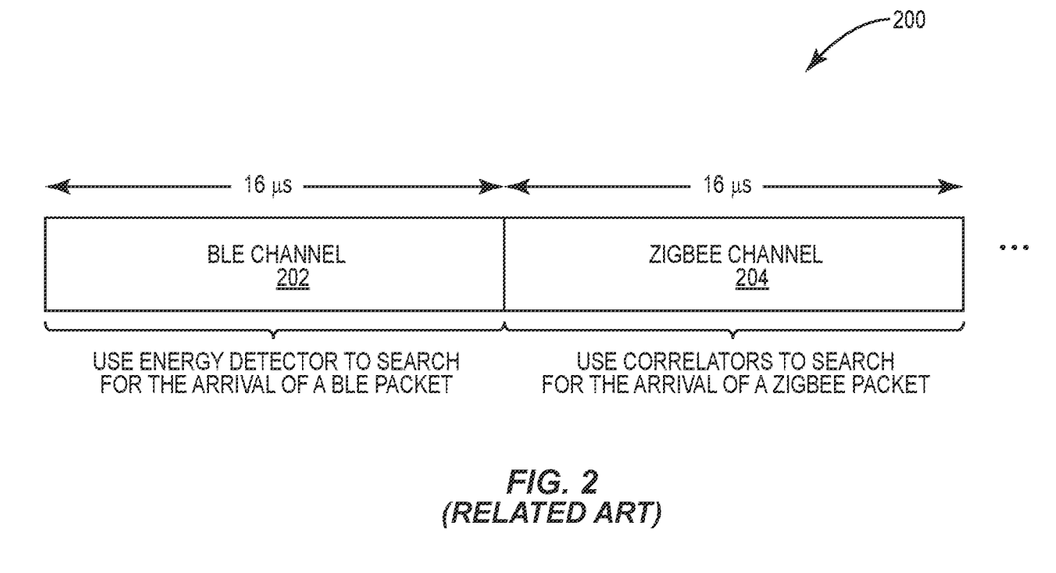
FIG. 2 is a timing diagram showing how an IoT device that uses two protocols may time division multiplex reception to detect incoming signals.
Figure 3:
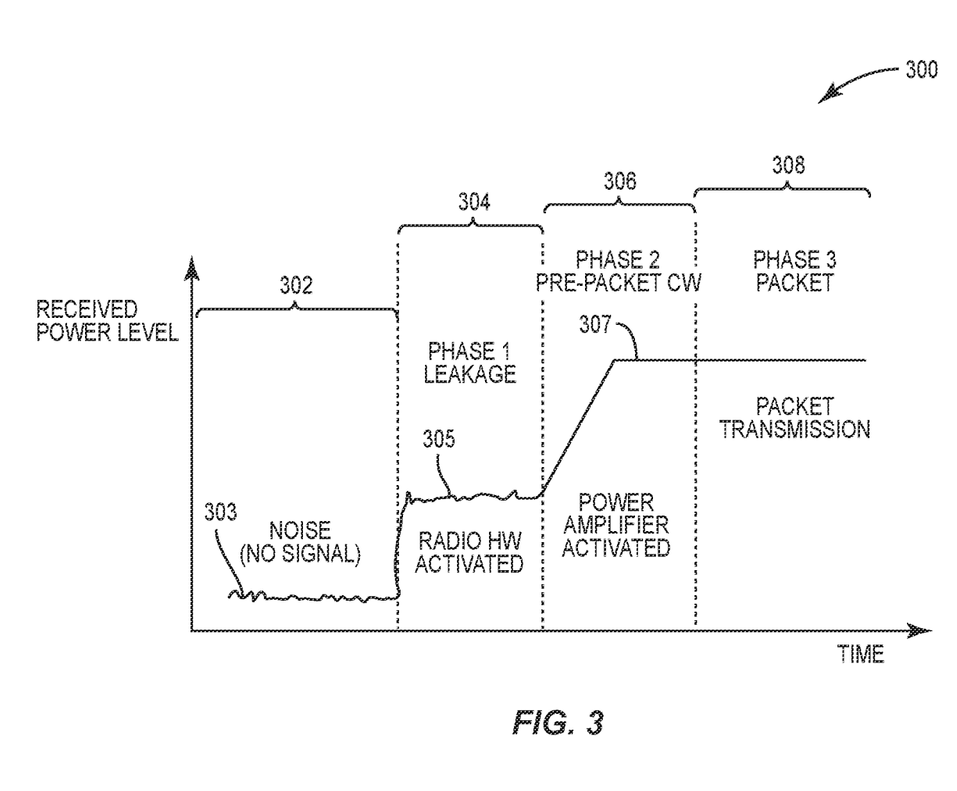
FIG. 3 is a power versus time graph for an emitter operating according to one of the protocols and, in particular, illustrating certain pretransmission emission characteristics.

Before addressing exemplary aspects of the present disclosure, a brief overview of the universe of Internet of Things (IoT) devices and their operation in dual protocol situations is provided with reference to FIGS. 1 to 3. A discussion of exemplary aspects of the present disclosure begins below with reference to FIG. 4.

In this regard, FIG. 1 illustrates a Venn diagram 100 of IoT devices. When IoT first started to get traction in the market place, vendors relied on the IEEE 802.15.4 standard (i.e., ZIGBEE or Thread) to define how the IoT devices communicated. Thus, within the set 102 of IoT devices, a subset 104 of IoT devices relied on ZIGBEE. Subsequently, the BLUETOOTH consortium introduced BLUETOOTH LOW ENERGY (BLE), which used less power and provided different advantages relative to ZIGBEE. A second subset 106 of IoT devices relied on BLE. However, there remained use cases where ZIGBEE had comparative advantages. Likewise, there were myriad IoT devices already deployed that relied on ZIGBEE. Vendors faced the conundrum of how to exploit both technologies while remaining backward compatible with the existing deployed devices. Accordingly, an intersection 108 of IoT devices are being deployed that utilize both ZIGBEE and BLE. The remainder 110 of the set 102 may use some other protocol and/or may utilize multiple protocols.

To accommodate the IoT devices in the intersection 108, vendors were faced with decisions about how to make the IoT devices work in both protocols concurrently. While there were vendors that decided to implement two separate transceivers, each with their own amplifiers and processing circuitry optimized for the particular requirements of ZIGBEE and BLE, such an approach is costly, consumes comparatively large amounts of power, which for battery-operated IoT devices is suboptimal, and requires use of double the space to handle the two circuits instead of a single transceiver.

Another solution, illustrated by a signaling diagram 200 in FIG. 2, is to do some sort of time division multiplexing, where a single transceiver operates using a first protocol (e.g., BLE) for a first time period 202 and operates using a second protocol (e.g., ZIGBEE) for a second time period 204. The receiver may switch, not only between protocols, but also between frequency channels when switching between protocols. In some implementations, the time periods 202, 204 are equal and may be, for example, sixteen microseconds (16 μs). Within each time period 202, 204, the receiver listens for incoming signals and determines if an incoming signal is using the selected protocol. More detail on this approach can be found in U.S. Patent Application Publication Nos. 2018/0324829 and 2019/0238309 both of which are hereby incorporated by reference in their entireties.

In practice, data collected during the time period 204 is cross-correlated against an expected synchronization sequence transmitted in front of a ZIGBEE packet per the protocol. Since the ZIGBEE synchronization sequence has a repeated 16 μs pattern, the collection of 16 μs of data that is then cyclically convolved against this pattern is sufficient to detect the pattern. That is, when the magnitude of the correlation is larger than a threshold, the receiver operates to begin data detection of the subsequent ZIGBEE packet.

However, such correlation approach is ill-suited for use with BLE. A BLE packet has a 40 μs synchronization pattern, consisting of an 8 μs preamble and a 32 μs access address. This "pattern" is, in general, a random sequence that does not repeat regularly leading to little correlation when cyclically convolved, particularly considering that the data collected can come from any portion of the 40 μs pattern.

Thus, instead of using a simple convolution, BLE detection relies on a detection of a sudden increase in signal levels at the frequencies of interest. Such signal level increase is inferred to mean that a BLE packet has arrived. When this happens, the receiver stops switching back and forth between ZIGBEE and BLE channels, and stays on the BLE channel searching for a packet. Again, since this can happen at any time during the start of the packet, the detector correlates the incoming signal to the expected pattern at the end of a BLE sequence. If this correlation results in a large value, the BLE packet is found and data detection begins.

Errors in BLE detection may occur when a nearby ZIGBEE system operates in the same, overlapping, or nearby channels. Thus, the BLE detector may detect an increase in signal level caused by a ZIGBEE signal and spend time treating the ZIGBEE signal as an incoming BLE signal. When the end of sequence correlation fails, the receiver returns to the ZIGBEE channel, but too much time may have lapsed and the ZIGBEE synchronization sequence has ended, precluding ready correlation detection of the ZIGBEE signal by the ZIGBEE detector. Likewise, even if the channels do not overlap, there may be instances when a ZIGBEE signal of sufficiently high power has leakage into the BLE channels causing the same sort of detected increase in signal level. Thus, there is room for improvement in concurrent multistandard detection.

While the present disclosure focuses on ZIGBEE and BLE, it should be appreciated that there may be other multistandard devices using different standards that have similar issues and may benefit from the present disclosure. Accordingly, the present disclosure is not limited to ZIGBEE and BLE.

Exemplary aspects of the present disclosure take advantage of a common feature of radio signal transmission as better explained below. This common feature is illustrated in the received power level versus time graph 300 in FIG. 3. Specifically, radio transmitters do not instantly turn on and begin transmission of signals of interest. There is a predictable pretransmission sequence of emissions which may be detected by receivers. In particular, at an initial time 302, there is no signal being generated by the transmitter and accordingly only noise 303 is detected at the receiver. At some time, the transmitter begins to activate in preparation of signal transmission. During the window of time 304, radio hardware at the transmitter is powered up and activated, but power amplifiers within the transmitter are not active. This power up creates some coupling of the radio hardware signals to the antenna which radiates at low power levels such as power level 305 above the noise 303. Subsequently, during the window of time 306, power amplifiers within the transmitter are activated, which causes emissions from the transmitter to ramp up to a transmission level 307. The slope of the ramp is chosen to reduce spectral leakage and allow local oscillators to settle after being perturbed by current changes when the power amplifier is activated. After the circuit has settled, a packet may be sent in the window of time 308. Any of the signals in the windows of time 304, 306, or 308 will cause an increase in signal level received by the receiver.

The authors have noted that almost all transmitters transmit a periodic pattern consisting of either a pure sine-wave or some extension of a preamble for the soon to be transmitted packet. This repeated pattern forms a constant wave transmission that may be as short as 4 μs and as long as 80 μs.

Exemplary aspects of the present disclosure use multiple detectors optimized to detect different ones of the predictable pretransmission emissions and from there determine if a packet is incoming that justifies staying with one protocol rather than switching back to another protocol in a multistandard receiver. In particular, a first detector may be used to see if there is an increase in signal level during an appropriate time division slot. If such increase in signal level is detected, the other detectors may be used to see if predictable pretransmission emissions can be found.

Figure 4:
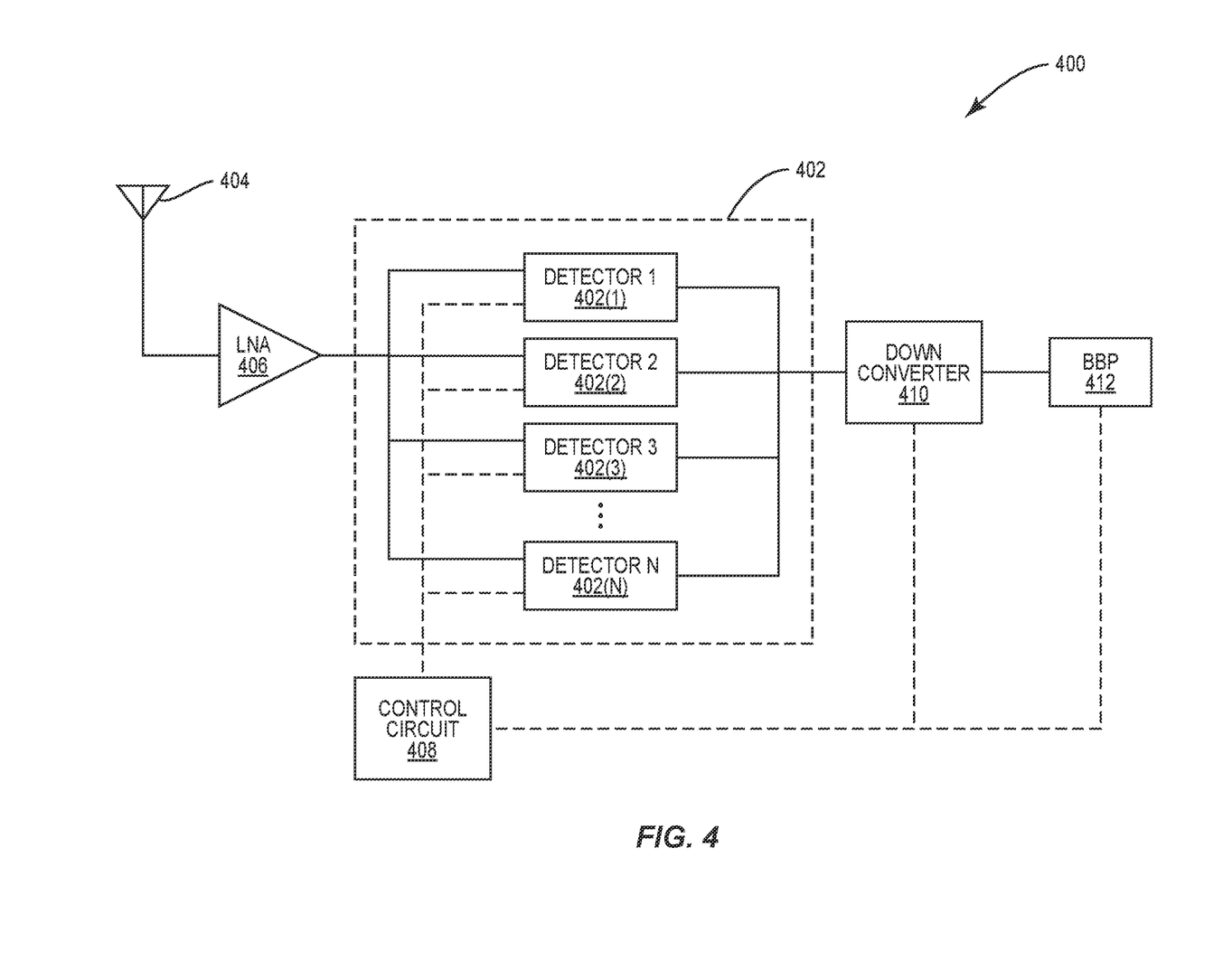
FIG. 4 is a block diagram of a receiver that receives two protocols concurrently and uses multiple detectors to facilitate pretransmission detection.

In this regard, FIG. 4 illustrates a block diagram of a receiver 400 that includes multiple detectors 402(1)-402(N) within a detector bank 402, where, as illustrated, N is three, that are used to analyze incoming emissions and determine if the impinging electromagnetic radiation falls within a predictable pretransmission emission or is the actual packet of interest. The receiver 400 has at least one (and perhaps more than one) antenna 404. Electromagnetic radiation impinges on the antenna 404 and is converted to an electrical current which is amplified by a low noise amplifier (LNA) 406. The LNA 406 provides an amplified signal to the detector bank 402. As noted, the detector bank 402 includes multiple detectors 402(1)-402(N) which concurrently operate on the amplified signal to evaluate the contents thereof and compare such contents to thresholds so as to determine if the amplified signal is a signal of interest indicative of a packet according to the standard being evaluated.

A control circuit 408 may control the detectors 402(1)-402(N) and, if a positive determination is made, allow the signal to go to downconversion circuitry 410 for frequency conversion before further processing by a baseband processor (BBP) 412.

Using the example of a receiver 400 that operates in ZIGBEE and BLE, the detectors 402(1)-402(N) are used in the detection of BLE signals. The first detector 402(1) may be a conventional detector used in existing systems to synchronize to a BLE packet. This detector 402(1) is designed to detect an increase in signal levels being received. Initially, if the first detector 402(1) detects a signal level above a predefined threshold, the control circuit 408 may activate the other two detectors 402(2)-402(3) to assist in signal detection. The first detector 402(1) is also designed to correlate a received signal to a last portion of the access code. The last portion of the access code is used to meet worst case timings when the entire first portion of the BLE synchronization word arrives while the receiver 400 is on the ZIGBEE channel. Whenever this correlation result has a high enough magnitude (i.e., exceeds a first threshold) the control circuit 408 causes the receiver 400 to remain on the BLE channel and commence detection of a BLE packet.

Figure 5:
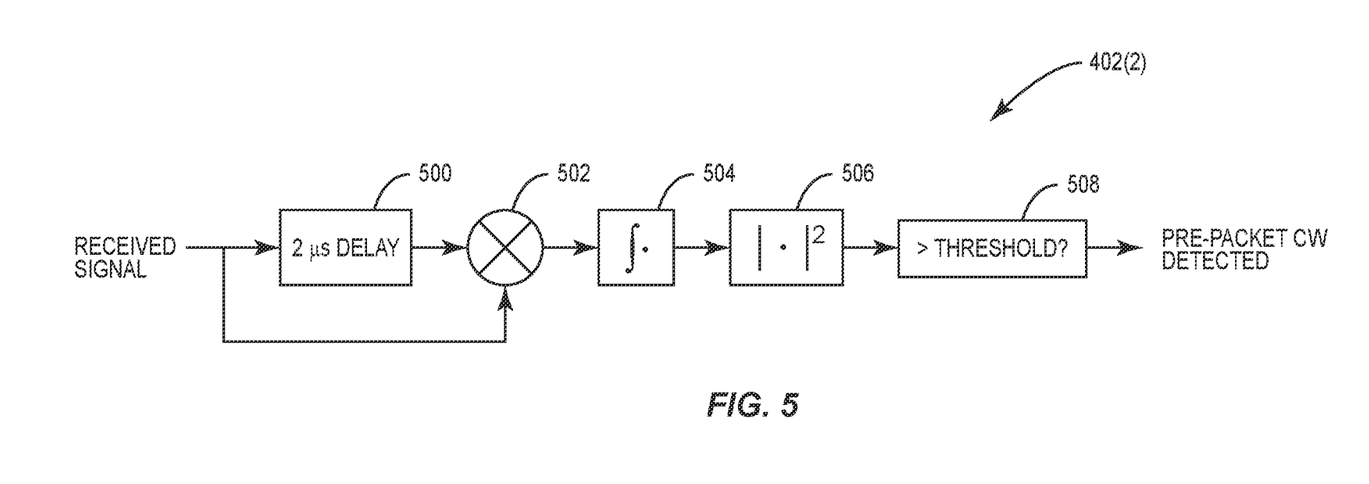
FIG. 5 is a block diagram of one detector used in the receiver of FIG. 4.

An exemplary aspect of the second detector 402(2) is illustrated in FIG. 5. While other detectors could be used, a particularly contemplated detector implements an auto-correlation function with a 2 μs lag. That is, the second detector 402(2) includes a delay circuit 500 that provides a 2 μs lag. The original signal and the delayed signal are correlated against one another by a correlator circuit 502. This correlated value is accumulated or integrated by an accumulator 504 over some period to remove noise, and a magnitude is generated by a circuit 506. The output of the circuit 506 is compared to a threshold a comparator 508. The output of the circuit 506 will rise to a large value if a period constant wave signal is present or if a 2 μs repeated pattern (like the BLE preamble or the repeated signal of window 306) is present. This large value will exceed the threshold used by the comparator 508, causing the control circuit 408 to conclude that a constant wave signal is present. It should be appreciated that if the transmitter uses a differently timed repeated pattern in window 306, the delay circuit 500 may be adjusted accordingly.

In a first exemplary aspect, when the control circuit 408 concludes that there is a constant wave signal, the control circuit 408 may remain on the BLE channel and reset a timer until the constant wave signal ends. The end of the constant wave signal would indicate the start of a packet. In a second exemplary aspect, the control circuit 408 may quickly hop to the ZIGBEE (or other standard) channel and search for a packet before returning to the BLE channel to resume the search. The second aspect has the benefit of catching any new ZIGBEE packets which might arrive while listening to the BLE channel. In either case, the second detector 402(2) solves the problem of lengthy prepacket constant wave transmissions (e.g., window 306) that may otherwise not work well with the 16 µs time slot contemplated in FIG. 2.

The third detector 402(3) is provided to detect leakage transmissions during window 304. Such leakage transmissions are often a-periodic and noise-like. Leakage transmission will therefore not be detected by the second detector 402(2) or the first detector 402(1). The third detector 402(3) is illustrated in greater detail in FIG. 6 and compares two moving averages to detect a sudden increase in signal level relative to the noise level.

Figure 6:
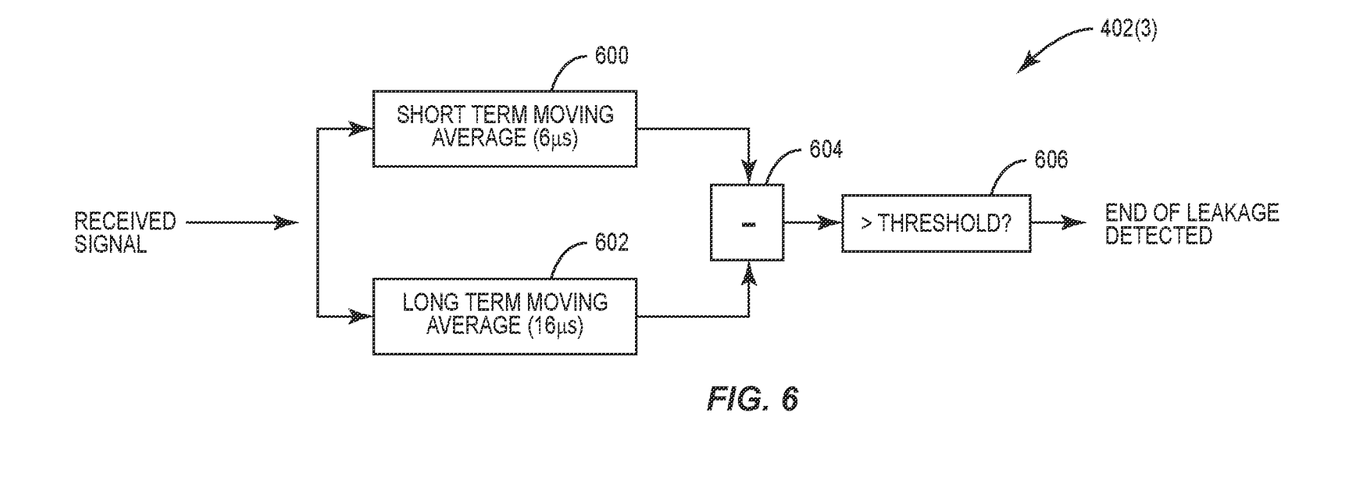
FIG. 6 is a block diagram of a second detector used in the receiver of FIG. 4.

In this regard, the third detector 402(3) includes a short-term moving averaging circuit 600 and a second long-term moving averaging circuit 602. In an exemplary aspect, the short-term average is 6 µs and the long-term average is 16 µs. The long-term average will, over time, approximate the noise level while the short-term average will show any sudden increases in signal level. Thus, the long-term average is subtracted from the short-term average by a subtraction circuit 604 and the output compared to a threshold using a comparator 606 or the like. If the difference exceeds the threshold, the control circuit 408 may infer that the leakage transmission has ended and a new signal has arrived. Other values than 6 and 16 µs may be used, but given the 16 µs windows of FIG. 2, these numbers work well. As with a detection by the second detector 402(2), the control circuit 408 may operate in two ways (i.e., remain on the BLE channel or hop over to the ZIGBEE channel). The latter approach allows partially filtered ZIGBEE signals on overlapping channels to be more readily detected, eliminating some false positives on the BLE channel.

To recap, a receiver will initially be searching for packets, and switching back and forth between different protocols (and possibly switching between frequency channels). For the BLE/ZIGBEE device, this switching may take place every 16 µs. If, during the BLE slot, the first detector 402(1) discovers energy has increased indicative of the arrival of a new signal, the receiver may activate the second detector 402(2) and the third detector 402(3) while the first detector 402(1) continues to look for the BLE preamble. If the second or third detector 402(2)-402(3) detects pretransmission emissions within the 16 µs, the receiver may stay on the BLE channel longer to give the first detector 402(1) time to discover the BLE preamble. If the second and third detectors 402(2) and 402(3) do not find pretransmission emissions, and the first detector 402(1) does not detect a preamble within the 16 µs, the receiver goes back to the ZIGBEE channel and continues with the 16 µs time-multiplexing search.

While the detectors 402(1)-402(N) are described as circuitry, they may be implemented as software that operates within the control circuit 408 without departing from the present disclosure.

While the above discussion is generally abstract about what the IoT device that uses the receiver of the present disclosure may be, there are concrete examples of use cases. For example, a lighting system may use both ZIGBEE and BLE, where a ZIGBEE Light Link is the networking protocol, but the individual lights may listen to BLE to detect new connections. Thus, a user may use a smart phone or table with BLE to control lighting while the ZIGBEE network ensures that the correct light or set of lights change responsive to the user's commands.

A second use case is a senior assistance monitoring system where devices within a smart home are connected by ZIGBEE, but sensors within the system monitor an elderly or alternately enabled individual through a body-worn BLE device such as a smart phone.

A third use case would be proximity detection, such as for example, controlling lights. The movement of a BLE device is detected and causes changes of states of devices within a ZIGBEE network.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A receiver comprising:
    a first detector configured to detect, within a predefined time slot, a packet in an incoming signal through correlation with a known preamble;
    a second detector configured to detect prepacket emissions through constant wave detection in the incoming signal; and
    a control circuit coupled to the first detector and the second detector, the control circuit configured to:
        conclude that a constant wave signal is present if an output of the second detector indicates that a detected signal exceeds a threshold; and responsive to concluding that the constant wave signal is present, extend a time period in which the first detector is allowed to detect a packet preamble.

2. The receiver of claim 1, wherein the second detector comprises a delay circuit and a correlation circuit that correlates an input signal with a delay output of the delay circuit.

3. The receiver of claim 2, wherein the second detector comprises an accumulator circuit coupled to the correlation circuit.

4. The receiver of claim 3, wherein the second detector comprises a magnitude circuit coupled to the accumulator circuit.

5. The receiver of claim 4, wherein the second detector comprises a comparator coupled to the accumulator circuit, wherein the comparator compares the threshold to an output from the magnitude circuit.

6. The receiver of claim 1, further comprising a third detector coupled to the control circuit, the third detector configured to detect leakage transmission.

7. The receiver of claim 6, wherein the third detector comprises a short-term averaging circuit and a long-term averaging circuit configured to provide a short-term average and a long-term average of the incoming signal.

8. The receiver of claim 7, wherein the third detector comprises a subtraction circuit configured to subtract the long-term average from the short-term average.

9. The receiver of claim 8, wherein the third detector comprises a comparator coupled to the subtraction circuit and configured to compare an output of the comparator to the threshold.

10. The receiver of claim 1, wherein the control circuit is configured to switch between a first mode using the first detector and the second detector to detect a signal operating in a first wireless protocol and a second mode wherein the receiver is configured to detect a signal operating in a second wireless protocol.

11. The receiver of claim 10, wherein on detection of the constant wave signal, the control circuit is configured to switch to the second mode.

12. The receiver of claim 10, wherein the first mode comprises a BLUETOOTH LOW ENERGY (BLE) mode and the second mode comprises a ZIGBEE mode.

13. The receiver of claim 1, wherein the control circuit is further configured to activate the second detector responsive to detecting an increase in signal strength with the first detector.

14. A receiver comprising:
a first detector configured to detect, within a predefined time slot, a packet in an incoming signal through correlation with a known preamble;
a second detector configured to detect prepacket emissions through leakage transmission detection in the incoming signal; and
a control circuit coupled to the first detector and the second detector, the control circuit configured to:
conclude that a leakage transmission is present if an output of the second detector indicates that a detected signal exceeds a threshold; and
responsive to concluding that the leakage transmission is present, extend a time period in which the first detector is allowed to detect a packet preamble.

15. The receiver of claim 14, wherein the second detector comprises a short-term averaging circuit and a long-term averaging circuit configured to provide a short-term average and a long-term average of the incoming signal.

16. The receiver of claim 15, wherein the second detector comprises a subtraction circuit configured to subtract the long-term average from the short-term average.

17. The receiver of claim 16, wherein the second detector comprises a comparator coupled to the subtraction circuit and configured to compare an output of the comparator to the threshold.

18. The receiver of claim 17, further comprising a third detector configured to detect a constant wave signal in the incoming signal, wherein the third detector is coupled to the control circuit.

19. The receiver of claim 14, further comprising a low noise amplifier coupled to the first detector.

20. The receiver of claim 14, wherein the control circuit is further configured to activate the second detector responsive to detecting an increase in signal strength with the first detector.

* * * * *